United States Patent [19]

Fegerl et al.

[11] 4,426,709
[45] Jan. 17, 1984

[54] ARRANGEMENT FOR THE PRODUCTION OF STEEL

[75] Inventors: Josef Fegerl; Walter Lugscheider, both of Linz, Austria

[73] Assignee: Voest-Alpine Aktiengesellschaft, Linz, Austria

[21] Appl. No.: 450,007

[22] Filed: Dec. 15, 1982

[30] Foreign Application Priority Data

Dec. 23, 1981 [AT] Austria ................................. 5533-81

[51] Int. Cl.³ ............................................. F27B 14/06
[52] U.S. Cl. ........................................ 373/22; 75/12; 266/225
[58] Field of Search .................................... 373/22-25; 75/10 R, 11, 12; 266/225, 226; 219/121 PP, 121 PQ

[56] References Cited

U.S. PATENT DOCUMENTS

| 3,147,329 | 9/1964 | Gage ..................................... 373/22 |
| 3,216,714 | 11/1965 | Eibl et al. ............................ 266/225 |
| 3,316,082 | 4/1967 | Barloga et al. ......................... 75/12 |
| 3,347,766 | 10/1967 | Death et al. ......................... 75/10 R |
| 4,082,914 | 4/1978 | Bortnichuk et al. .................. 373/22 |
| 4,275,827 | 6/1981 | Hiratake ....................... 219/121 PR |

Primary Examiner—M. J. Andrews
Attorney, Agent, or Firm—Brumbaugh, Graves, Donohue & Raymond

[57] ABSTRACT

In an arrangement for the production of steel from solid and/or liquid charging materials, such as pig iron, heavy scrap and light scrap, a liftable and lowerable heating-refining arrangement and, if desired an arrangement for supplying further additions are positioned in a refactorily lined refining vessel. In order to be able to use as high a scrap portion of the materials charged as possible without substantially increasing the time required until the end of the refining operation per charge, the heating-refining arrangement consists of a plasma burner, a jacket surrounding the plasma burner for supplying oxygen, and a cooling jacket surrounding that jacket, a counter-electrode being arranged in the bottom of the refining vessel.

19 Claims, 3 Drawing Figures

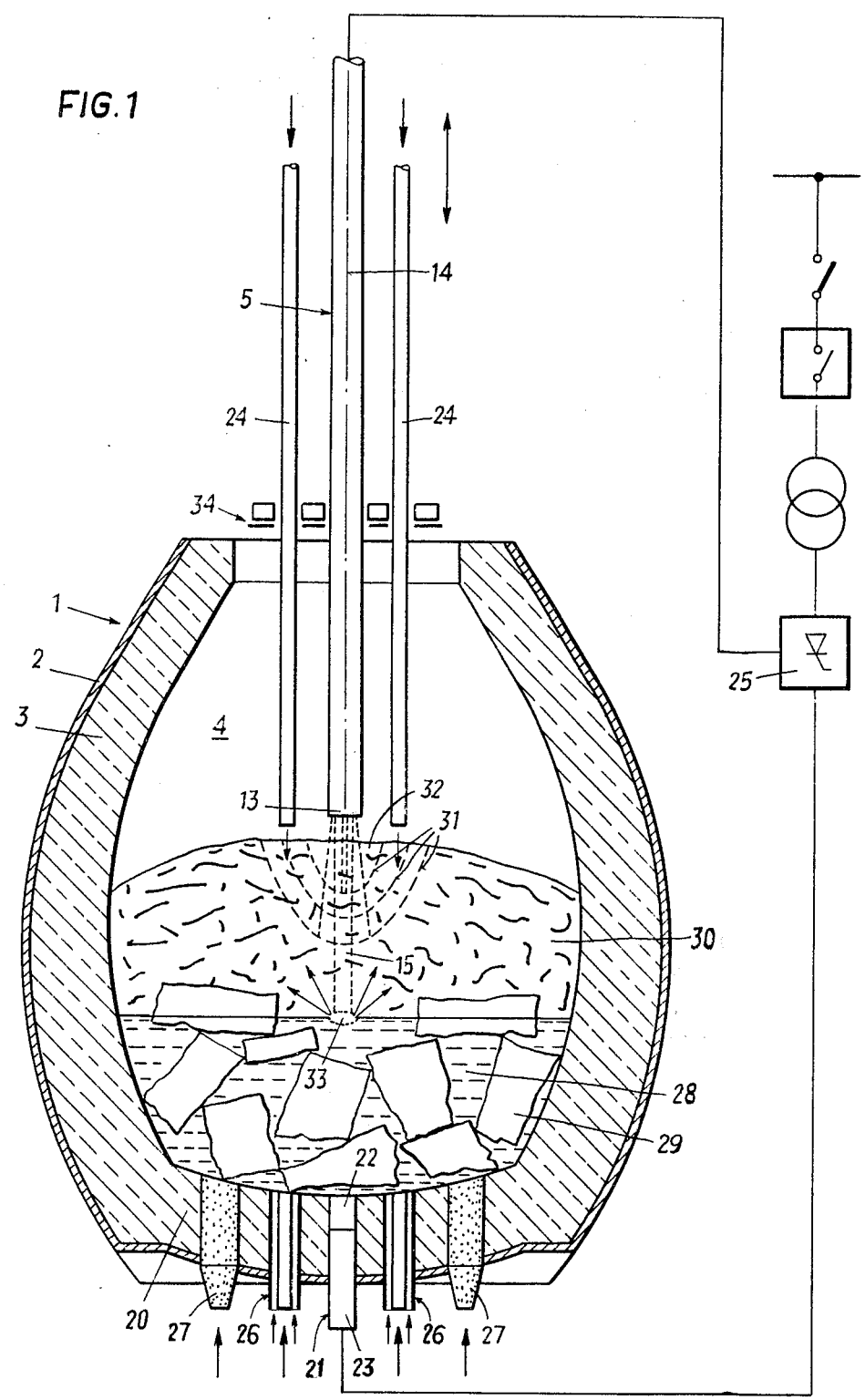

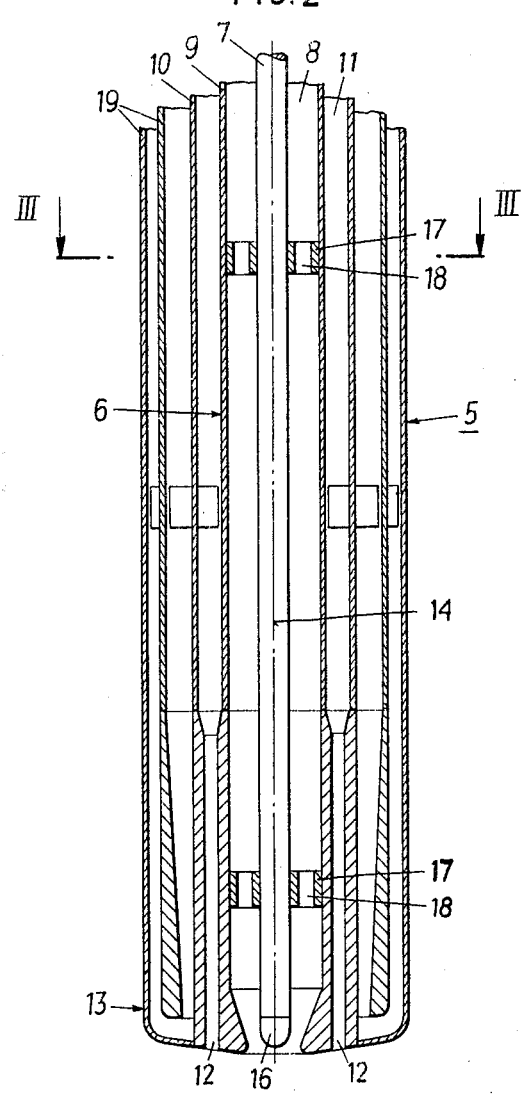
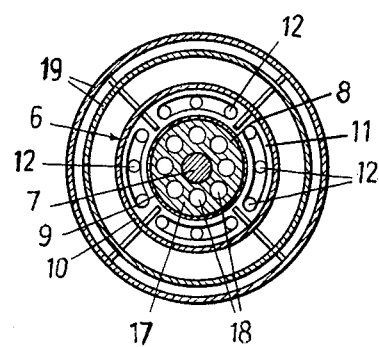

ARRANGEMENT FOR THE PRODUCTION OF STEEL

BACKGROUND OF THE INVENTION

The invention relates to an arrangement for producing steel from solid and/or liquid charging materials, such as pig iron, heavy scrap and light scrap, with a refractorily lined refining vessel in which a heating-refining arrangement is liftably and lowerably positioned, and, if desired, an arrangement for supplying further charging materials is positioned.

It has already been known (Austrian Pat. No. 232,531) to supply heat that has been missing to the materials charged by means of burners in order to reach the refining temperature or to increase the scrap charged, wherein a blow pipe having an oxygen blowing pipe and a fuel supplying pipe is provided as heating-refining means. Through the fuel supplying pipe, oil or natural gas, i.e., a fossile fuel, is led into the refining vessel.

With this known means it is possible to increase the amount of scrap charged, yet with the increase in the scrap portion also the time needed for charging increases, since the flame first has to work through the charged scrap that is present above the molten pig iron. The oxygen supplied ignites only if the flame has melted enough scrap down to the pig iron bath level, which takes relatively long.

The invention aims at avoiding these difficulties and has as its object to provide an arrangement of the initially defined kind which makes it possible to increase the scrap portion of the materials charged, wherein, however, the time passing until the end of the refining procedure per charge is not substantially increased. In particular it shall also be possible to charge badly contaminated light scrap, such as, e.g., scrap from cars and surface-coated cans, etc.

SUMMARY OF THE INVENTION

According to the invention, this object is achieved in that the heating-refining arrangement is comprised of a plasma burner, a jacket surrounding the plasma burner for supplying oxygen, and a cooling jacket surrounding that jacket, a counter-electrode being arranged in the bottom of the refining vessel. Suitably, the jacket is formed by a ring of gap-shaped or round nozzles.

A plasma burner provided with an annular cathode from which an electric arc originates and in which oxygen is supplied to the electric arc at the center of the annular cathode, is known from German Offenlegungsschrift No. 29 12 843. Since with this known plasma burner the active gas is introduced into the center of the electric arc, a chemical reaction with the active plasma gas also would only be possible in the center of the jet. Thus, if this known plasma burner were to be used for a refining procedure, the chemical reaction would be restricted to a narrow space and the formation of a wide melting front would be hampered. The oxygen jet surrounded jacket-like by the plasma gas cannot fulfil its function in the oxygen blowing method, since it gets into reaction contact with the pig iron and the melted scrap only to a very limited extent. None or only a very slight exothermal reaction is formed at the jacket face between the plasma jet and the scrap.

Advantageously, the heating-refining arrangement of the invention is surrounded by a ring of lances for the supply of additions, such as $Fe_2O_3$-dust (LD-dust).

According to a preferred embodiment, the plasma burner has a central, rod-shaped electrode and an annular space surrounding the electrode for supplying the plasma gas.

BRIEF DESCRIPTION OF THE DRAWINGS

The invention shall now be explained in more detail by way of an exemplary embodiment and with reference to the drawings, wherein:

FIG. 1 is a section through the vertical axis of a refining vessel,

FIG. 2 is a section through the lance inserted in this refining vessel, and

FIG. 3 is a section along line III—III of FIG. 2.

DETAILED DESCRIPTION OF THE DRAWING

A refining vessel designed as a tiltable converter is denoted by 1. Its metallic outer jacket is denoted by 2, and its refractory lining is denoted by 3. In the upright position of the converter, a blowing lance 5 containing a plasma burner 6 (FIG. 2) reaches centrally into the interior 4 of the converter. This blowing lance 5 comprises a centrally located rod-shaped electrode 7 that is surrounded by an annular space 8 delimited by a jacket 9, plasma gas, formed of Ar or Ne, $N_2$, He, CO, $CO_2$, $H_2$ or mixtures thereof, being supplied through that annular space 8.

Preferably, the burner is to be operated with Ar, Ar-$N_2$-mixtures. The arc-lengths thus forming are predetermined by the supply of electric voltage to the plasma burner.

The plasma burner 6 is surrounded by a further jacket 10, by which a further annular space 11 surrounding the plasma burner 6 for supplying technically pure oxygen (refining oxygen) is formed. At the tip of the plasma burner 6, the annular space 11, through which the oxygen is supplied, verges into tapering, radially-symmetrical openings 12, suitably Laval nozzles, of the head 13 of the blowing lance 5, which head 13 advantageously consists of copper. The outlet openings 12 for the oxygen are parallel to the axis 14 of the burner or inclined by a slight acute angle to the axis 14, the oxygen jet thus emerging from the annular space 11 either cylindrically or cone-like outwardly diverging. This has the purpose of mixing the oxygen with the plasma jet 15 at as large a distance from the blowing lance head 13 as possible. This considerably increases the useful life of the cathode 7, in particular of its tip 16 made of tungsten metal. The insulators 17 holding the cathode are provided with passage openings 18 for an undisturbed passage of the plasma gas.

On its outer side the blowing lance is surrounded by a double cooling jacket 19, in which a coolant circulation is maintained in a known manner.

In the converter bottom 20 (FIG. 1), a bottom electrode 21 is also centrally inserted, which bottom electrode 21 is provided with a wear part 22 of steel and a water-cooled current supply 23 of copper.

For the charging of additions, the centrally arranged blowing lance 5 is surrounded by two or more parallelly arranged lances 24 which are arranged radially symmetrical to the blowing lance 5. Through these self-consuming lances 24 LD-dust, fine ore, lime or other pulverized additions can be charged.

Preferably, the plasma burner is designed as a direct direct-current-arc burner. The burner is supplied via power converters 25 equipped with thyristors. The electric control in principle is shown in FIG. 1 in a one-phase illustration.

In the bottom 20 of the converter 1, there are inserted bottom jacket nozzles 26 for supplying oxygen (as a jacket) and pulverized coal (centrally) as well as porous bricks 27 for supplying argon, in order to allow for a far-reaching process control.

The arrangement functions in the following manner: After the converter 1 has been charged with pig iron 28, heavy scrap 29 and light scrap 30, the plasma burner 6 is ignited between the central tungsten cathode 7, 16, and the scrap 29, 30 which is in conductive connection with the bottom electrode 21 via the pig iron 28. The plasma arc 15 melts a central cone into the scrap, thus providing for favorable conditions for the ignition of the oxygen jet emerging from the blowing lance 5.

The melting profile 31 resulting is illustrated in FIG. 1 in broken lines. As can be seen, immediately after igniting the plasma burner, in the scrap 30 there forms a funnel-shaped hollow 32 which gradually—by a stepwise or continuous lowering of the blowing lance 5—becomes deeper and deeper and, viewed in the radial direction, wider and wider. The heat transmission from the central plasma jet to the scrap takes place through the oxygen jacket surrounding it without any noticeable absorption.

The temperature of the plasma jet 15, depending on the plasma gas used, is between 5,000 and 30,000 K. Simultaneously with the ignition of the plasma burner 6, oxygen is supplied through the blowing lance.

By the above-disclosed parallel or diverging supply of oxygen, the zone of maximum heat emission of the plasma jet to its surroundings is made use of. The oxygen gets into reaction contact where it is needed the most: in the scrap 30 that has been pre-heated by the plasma burner 6.

After the ignition of the oxygen jet at the surface of the pig iron bath, there form two melting centers for the scrap, whose distance decreases during the continuous blowing operation, i.e., the melting center of the plasma arc on the scrap travels in the direction of the burning spot 33 (the reaction zone between $O_2$ and pig iron 28) of the oxygen top blowing region.

The advantage of the arrangement of the invention consists mainly in that the heat transmission of the electrically supplied energy, by radiation of the plasma jet 15, and the heat production, by exothermal reaction of the pig iron and/or scrap with pure oxygen, are optimally combined, wherein the use of the plasma burner 6 makes it possible to obtain the shortest melting times possible.

By nozzling in LD-dust through the self-consuming lances 24, the LD-dust gets into the radiation region of the plasma arc, i.e., in that area where the development of CO gas is the strongest, whereby also the reducing components are made use of and the burn-up by oxygen is prevented. By the pronounced, mainly radially outwardly acting heat radiation of the plasma jet 15, these additions are heated very quickly. With this reduction process, also metallic impurities of the LD-dust, in particular zinc, are evaporated, which zinc may deposit above the converter in the region of the off-heat means 34 and thus a recycling of contaminated LD-dust is made possible.

The invention is not limited to the exemplary embodiment illustrated in the drawings, but may be modified in various respects. It is, for instance, possible to provide a number of burners in addition, the blowing lance 5 being radially symmetrically surrounded by further plasma burners. Thereby a somewhat larger volume of scrap is melted—with basically the same sequence as described above.

Furthermore, the blowing lance may, as known per se, be articulately suspended at its upper end, so as to obtain a circular movement (precession movement) during operation for enlarging the reaction zone 33 and for causing a movement of the bath, respectively.

Instead of the nozzles 12 forming the jacket, an annular gap may be provided as outlet opening for the oxygen.

What we claim is:

1. In an apparatus for producing steel of materials charged, such as pig iron, heavy scrap and light scrap, said apparatus including a refining vessel having a bottom and a refractory lining, a heating-refining arrangement positioned in said refining vessel, and means for raising and lowering said heating-refining arrangement relative to said refining vessel, the improvement wherein a counter-electrode is arranged in said bottom of said refining vessel, and said heating-refining arrangement comprises a plasma burner, said plasma burner comprising a central electrode, and a first jacket immediately surrounding said central electrode and defining a first annular space through which a suitable plasma gas is delivered, and a second jacket surrounding said plasma burner and defining a second annular space through which oxygen is supplied simultaneously with the supply of said plasma gas in a direction parallel to or diverging outwardly from the direction of the supply of said plasma gas.

2. An apparatus as set forth in claim 1, wherein said materials charged are solid materials.

3. An apparatus as set forth in claim 1, whereins said materials charged are liquid materials.

4. An apparatus as set forth in claim 1, wherein said materials charged are solid and liquid materials.

5. An apparatus as set forth in claim 1, further comprising an arrangement for supplying further additions, said arrangement for supplying further additions being positioned within said refining vessel.

6. An apparatus as set forth in claim 5, wherein said arrangement for supplying further additions is comprised of a ring of lances surrounding said heating-refining arrangement.

7. An apparatus as set forth in claim 6, wherein said additions are $Fe_2O_3$-dust (LD-dust).

8. An apparatus as set forth in claim 1, wherein said plasma burner includes a central, rod-shaped electrode and an annular space surrounding said central, rod-shaped electrode, for supplying plasma gas.

9. An apparatus as set forth in claim 1, wherein said plasma-burner-surrounding jacket is formed by a ring of nozzles.

10. An apparatus as set forth in claim 9, wherein said nozzles are gap-shaped.

11. An apparatus as set forth in claim 9, wherein said nozzles are round.

12. In an apparatus for producing steel of materials charged, such as pig iron, heavy scrap and light scrap, said apparatus including a refining vessel having a bottom and a refractory lining, a heating-refining arrangement positioned in said refining vessel, and means for raising and lowering said heating-refining arrangement relative to said refining vessel, the improvement wherein a counter-electrode and nozzles for supplying oxygen are arranged in said bottom of said refining vessel, and said heating-refining arrangement comprises a plasma burner, said plasma burner comprising a central electrode, and a first jacket immediately surrounding said central electrode and defining a first annular space through which a suitable plasma gas is delivered, and a second jacket comprising a ring of nozzles surrounding said plasma burner and defining a second annular space through which oxygen is supplied simultaneously with the supply of said plasma gas in a direction parallel to or diverging outwardly from the direction of the supply of said plasma gas, said apparatus further comprising an arraangement within said refining vessel for supplying further additions and comprising a ring of lances surrounding said heating-refining arrangement.

13. An apparatus as set forth in claim 12, wherein said materials charged are solid materials.

14. An apparatus as set forth in claim 12, wherein said materials charged are liquid materials.

15. An apparatus as set forth in claim 12, wherein said materials charged are solid and liquid materials.

16. An apparatus as set forth in claim 12, wherein said additions are $Fe_2O_3$-dust (LD-dust).

17. An apparatus as set forth in claim 12, wherein said plasma burner includes a central, rod-shaped electrode and an annular space surrounding said central, rod-shaped electrode, for supplying plasma gas.

18. An apparatus as set forth in claim 12, wherein said nozzles are gap-shaped.

19. An apparatus as set forth in claim 12, wherein said nozzles are round.

* * * * *